United States Patent Office 3,207,723
Patented Sept. 21, 1965

3,207,723
STABILIZATION OF POLYVINYL CHLORIDE BY OXO ALCOHOL - DERIVED TRI - ALKYL PHOSPHITES AND BARIUM-CADMIUM PHENOLATES
Bernard Buchner, Westfield, and Alan F. Jackson, Woodbridge, N.J., assignors, by mesne assignments, to The American Agricultural Chemical Company, a corporation of Delaware
No Drawing. Filed Mar. 14, 1961, Ser. No. 95,469
1 Claim. (Cl. 260—45.7)

This invention relates to tri-alkyl phosphites. More particularly, this invention relates to novel tri-alkyl phosphites wherein the alkyl groups are derived from primary, branched chain alcohols, such as branched chain primary alcohols having a carbinol group near the middle of the chain, e.g., high molecular weight so-called oxo alcohols. This inventon also relates to a method of preparing these tri-alkyl phosphites and compositions containing same. Still more particularly, this invention relates to tri-alkyl phosphites wherein each of the alkyl groups contains at least 16 carbon atoms, such as from 16 to 20 carbon atoms.

The tri-alkyl phosphites of this invention are prepared by reacting an alkanol, specifically, a branched chain primary alcohol containing at least 16 carbon atoms per molecule, with phosphorus trichloride. Desirably, the reaction between the relatively high molecular weight alkanol and the phosphorus trichloride is carried out in the liquid phase in the pesence of an inert solvent or diluent, such as a solvent for the phosphorus trichloride and a solvent or diluent for the alkanol. Also, desirably, the reaction between the alkanol and the phosphorus trichloride is carried out at a relatively low temperature, preferably at a temperature below about −30° C., e.g. a temperature in the range −30° C. to −40° C., more or less. Although slightly higher reaction temperatures are permissible, such as a temperature as high as −5° C. to −20° C., it is preferred that the reaction between the alkanol and the phosphorus trichloride be carried out at a temperature not over −30° C.

In carrying out the reaction between the alkanol and the phosphorus trichloride, it is desirable that the phosphorus trichloride be diluted with a substantial amount of solvent therefor, such as at least one volume of the solvent per volume of phosphorus trichloride, and that the alkanol be diluted with a substantial amount of a solvent therefor, such as at least one volume of the solvent per volume of the alkanol, and that the resulting phosphorus trichloride solution be added incrementally to the alkanol, such as over a period of about 30–90 minutes, more or less.

Upon contact of the phosphorus trichloride with the alkanol a chemical reaction takes place with the liberation of hydrogen chloride. The thus-liberated hydrogen chloride is neutralized in order to avoid deleterious side reactions. Neutralization of the hydrogen chloride can be effected substantially instantaneously upon formation by including in the reaction admixture, such as in admixture with the solvent-diluted alkanol, a hydrogen chloride neutralizing agent. It is preferred, however, that neutralization of the hydrogen chloride be carried out towards the end of or after the reaction between phosphorus trichloride and the alkanol has been completed by the separate addition of the hyrogen chloride neutralizing agent, such as gaseous anhydrous ammonia.

The overall reaction between the alkanol and the phosphorus trichloride, together with neutralization of the formed hydrogen chloride is indicated by the following chemical equation:

$$3ROH + PCl_3 + 3NH_3 \rightarrow (RO)_3P + 3NH_4Cl$$

wherein R is a branched chain alkyl group derived from a branched chain primary alcohol containing at least 16 carbon atoms.

Following the neutralization operation the resulting reaction admixture is treated, such as by water washing, to remove water soluble inorganic salts therefrom, e.g., ammonium chloride. After removal of the inorganic salts, the reaction admixture is treated for removal of any water therefrom, such as by contact with a drying agent, e.g., anhydrous magnesium sulfate. The resulting substantially salt-free, dry reaction admixture, now containing substantially only the product tri-alkyl phosphite dissolved in the solvent, is subjected to fractionation, such as by flash distillation, for the removal of solvent therefrom and the eventual recovery of the tri-alkyl phosphite as product.

Any suitable inert solvent may be employed as the solvent or diluent for the phosphorus trichloride and/or the alkanol employed in the chemical reaction in accordance with the practice of this invention. Suitable such solvents are diethyl ether, petroleum ether, methylene chloride, ethylene chloride, carbon tetrachloride, pentane, hexane, heptane, benzene, toluene and similar relatively low boiling, inert petroleum hydrocarbon or petroleum fractions or mixtures thereof.

Although ammonia, gaseous anhydrous ammonia, is the preferred hydrogen chloride neutralizing agent in the practice of this invention, other neutralizing agents are also suitable, such as the various tertiary organic amines, e.g. dimethylaniline, pyridine, diethylaniline, trimethylamine, triethylamine and the like.

In the chemical reaction itself it is preferred to employ an excess of the alkanol, such as at least 2%, e.g., 10%, stoichiometric excess. Also, it is preferred to employ an excess of the hydrogen chloride neutralizing agent, particularly in the instance of anhydrous ammonia. Following the neutralization operation excess ammonia can readily be removed by passing a current of gaseous nitrogen or similar, relatively inert gas through the reaction admixture to strip the excess ammonia therefrom.

In the preparation of the novel, relatively high molecular weight branched chain tri-alkyl phosphites of this invention the alkanol chemical reagent is a branched chain alkanol containing at least 16 carbon atoms per molecule, preferably from 16 to 20 carbon atoms per molecule inclusive, or mixtures of such alkanols. It is particularly preferred in the practice of this invention to employ primary branched chain alkanols containing from 16 to 20 carbon atoms per molecule containing a carbinol group near the middle of the chain and derived from the so-called oxo process for the manufacture of oxo alcohols. This process involves reaction between an olefin, e.g., an olefin containing at least 15 carbon atoms per molecule, carbon monoxide and hydrogen. The reaction and formation of these so-called oxo alcohols is also known as oxonation or hydroformylation.

Particularly suitable as alkanol starting materials in the practice of this inventioon are the $C_{16}$ alkanols, such as a $C_{16}$ alkanol produced by means of the oxo process and characterized by the structural formula

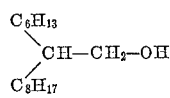

Also particularly suitable is the $C_{20}$ alkanol produced by the oxo process and characterized by the structural formula

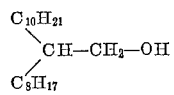

As indicated hereinabove mixtures of the above-identified alkanols, which themselves may be mixtures of isomeric alkanols, may be suitably employed in the preparation of the tri-alkyl phosphites of this invention.

The following examples are illustrative of a practice of this invention directed to the preparation of relatively high molecular weight tri-alkyl phosphites wherein each of the branched chain alkyl groups contains at least 16 carbon atoms.

EXAMPLE NO. 1

A $C_{16}$ alkanol, a so-called oxo alcohol produced by the oxo process and having the empirical formula $C_{16}H_{33}OH$, a specific gravity at 20° C. of about 0.8443, a hydroxyl number (mg. KOH/gm.) of 228, a refractive index $n_d{}^{20}$ of 1.4513 and a freezing point below —60° F. in an amount of 149 grams (0.612 mol) was dissolved in 300 ml. of petroleum ether having a boiling range of about 38–42° C. A solution of 27.5 grams (0.2 mol) of phosphorus trichloride in 80 ml. of the above-identified petroleum ether at about room temperature was added dropwise with agitation to the above alcohol solution at a temperature of about —35° C. The phosphorus trichloride solution was added dropwise at a rate to complete the addition of the phosphorus trichloride in about 45 minutes. During the dropwise addition of the phosphorus trichloride solution the resulting reaction admixture was maintained at about —35° C.

Following the addition of the phosphorus trichloride the resulting admixture was agitated for an additional 15 minutes while maintaining the reaction admixture at a temperature of about —35° C. Thereupon, gaseous, anhydrous ammonia was introduced into the reaction admixture to neutralize the hydrogen chloride therein, the reaction admixture still being maintained at about —35° C. during the addition of ammonia. Upon completion of the addition of ammonia in an amount at least sufficient to neutralize the hydrogen chloride, the resulting neutralized reaction admixture was permitted to gradually warm to about room temperature while at the same time stripping excess ammonia therefrom by passing a stream of gaseous nitrogen through the reaction admixture. The resulting neutralized, stripped reaction admixture, now substantially free of excess ammonia, was water washed twice with 700 ml. of water for the removal of the ammonium chloride produced during the neutralization operation. The resulting neutralized, water washed reaction admixture was then separated and dried over anhydrous magnesium sulfate.

Following the drying operation the dried reaction admixture was filtered to remove suspended solids therefrom and then subjected to flash distillation at a reduced pressure and at a temperature of about 30° C. for removal of the solvent petroleum ether. After solvent removal, the remaining reaction admixture was subjected to fractional distillation at a pressure of about 3 mm. Hg absolute to remove the unreacted $C_{16}$ alkanol. After removal of the unreacted alcohol the residue was distilled in a Rota-Film Molecular Still at a temperature of about 230° C. and at a pressure of about 0.006 mm. Hg absolute. There was recovered at a yield of about 90% the tri-alkyl phosphite having the formula

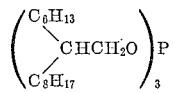

The resulting recovered tri-alkyl phosphite had a refractive index $n_d{}^{20}$ of 1.409 and a specific gravity $d_4{}^{20}$ of 0.878.

EXAMPLE NO. 2

A solution of a $C_{20}$ oxo alcohol, such as a $C_{20}$ oxo alcohol having a refractive index $n_d{}^{20}$ of 1.455, a boiling point at 20 mm. Hg absolute in the range 400–420° F., essentially a primary alcohol with two major branch chains attached to the carbon beta to the hydroxyl group, the branch chains being $C_{10}$ and $C_8$, a trimethylheptyl and a dimethylhexyl, respectively, was prepared by adding 182.7 grams (0.612 mol) of a $C_{20}$ oxo alcohol to 300 ml. of petroleum ether having a boiling range 39–50° C. To the resulting $C_{20}$ oxo alcohol solution there was added, dropwise with stirring, a solution of 27.5 grams (0.2 mol) of phosphorus trichloride in 80 ml. of the aforesaid petroleum ether. The addition of the phosphorus trichloride solution was carried out over a period of 40 minutes, the resulting reaction admixture being maintained at a temperature in the range —34° C. to about —38° C. Upon completion of the addition of the phosphorus trichloride solution the reaction admixture was neutralized by the addition of gaseous anhydrous ammonia, in slight excess, the reaction admixture being maintained at about —35° C. until all hydrogen chloride therein was neutralized and converted to ammonium chloride.

Thereupon the neutralized reaction admixture was permitted to warm gradually to room temperature, about 10° C. A stream of gaseous nitrogen was then passed therethrough for about one hour to strip or remove the excess ammonia. The stripped, neutralized reaction admixture was washed with water to separate the water soluble salts and then permitted to settle into an organic layer and a water layer. The organic layer was separated and contacted twice with 700 ml. water to remove ammonium chloride therefrom and after separation of the water, such as by settling and decantation, the water washed reaction admixture was dried over anhydrous magnesium sulfate. The resulting hydrated magnesium sulfate was separated from the reaction admixture by filtration.

The reaction admixture was then fractionated by flash evaporation to remove the solvent, petroleum ether, therefrom. The remaining reaction admixture was then fractionally distilled at 3 mm. Hg absolute to remove the unreacted $C_{20}$ oxo alcohol. The residue was then distilled in a Rota-Film Molecular Still at a pressure 0.011 mm. Hg absolute and at a temperature of 300° C. A yield of 88% tri-alkyl phosphite having the formula

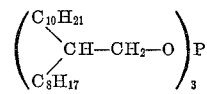

was obtained. The recovered product had a refractive index $n_d{}^{20}$ of 1.4644 and a specific gravity $d_4{}^{20}$ of 0.8745.

The tri-alkyl phosphites of this invention have many uses. Specifically, the tri-alkyl phosphites described herein are useful as stabilizers for acrylonitrile and acrylate esters fibers. These phosphites are also useful in herbicidal and pesticidal compositions since they possess some herbicidal and pesticidal properties. The subject phosphites are also useful as stabilizers and anti-oxidants in rubber compositions, both natural rubber and synthetic rubber.

In accordance with one aspect of this invention the subject tri-alkyl phosphites, particularly the $C_{16-20}$ tri-alkyl phosphites prepared from oxo alcohols, are useful as stabilizers or additives in resin compositions such as acrylic resin compositions and particularly compositions containing polyvinyl chloride. These polyvinyl chloride compositions include the calendered vinyls, the extruded vinyls, the vinyl plastisols, the vinyl organosols and the various other vinyl or vinyl resin containing materials such as vinyl floor tiles, etc.

In the absence of stabilizers polyvinyl chloride-containing compositions discolor under the influence of heat or upon exposure to ultraviolet light. In order to avoid this discoloration, stabilizing agents are usually incorporated in these compositions. Stabilizing agents such as lead salts, organo-tin compounds and barium-cadmium complexes, such as barium-cadmium phenates, have been suggested and employed. The lead salts, although providing good heat stability, do not avoid discoloration and as a result are used primarily not in polyvinyl chloride-containing compositions having a dark, opaque color, e.g. vinyl compositions used as electrical insulation materials. The organo-tin compounds employed as stabilizing agents are expensive and, of these, the tin mercaptides which are the most effective, are disliked because of their odor and cross-staining with compounds containing salts or metals which form dark sulfides. For clear vinyl films or sheeting the cadmium-barium-containing stabilizing agents are most effective. These cadmium-barium-containing complexes are usually organic salts, phenates, of these metals.

Organic phosphites have been employed in combination with stabilizing agents, such as the barium-cadmium-containing stabilizing agents to act as auxiliary stabilizing agents and to improve the stability of the resulting vinyl resin compositions containing these materials against heat and light. Also, epoxy plasticizers or epoxy resins have been used as auxiliary stabilizers.

As indicated hereinabove, it has been found in accordance with one aspect of this invention that the subject tri-alkyl phosphites possess exceptional properties as stabilizing agents, particularly as auxiliary stabilizing agents, in polyvinyl chloride-containing compositions especially in combination with barium-cadmium-containing stabilizing agents, e.g., barium-cadmium phenates.

It appears that the superiority of the tri-alkyl phosphites of this invention, particularly the tri-alkyl phosphites derived from $C_{16}$ to $C_{20}$ oxo alcohols, is due to the special molecular structure of these phosphites, viz, the highly branched chain configuration of the relatively high molecular weight alkyl radical portions thereof. The relatively high molecular weight, branched chain, alkyl radical portions thereof permit better compatibility in vinyl resin compositions and permits easier distribution in the vinyl compositions. It appears that the ability of these tri-alkyl phosphites to act as electron acceptors for reaction with oxygen to prevent discoloration of the vinyl compositions is due to their unique, special molecular structure.

The following example is illustrative of this aspect of the invention and demonstrates the superiority of the tri-alkyl phosphites of this invention as stabilizing agents in vinyl compositions.

EXAMPLE NO. 3

Four vinyl compositions having the formulation set forth in accompanying Table I were prepared:

Table I

| Composition | A | B | C | D |
|---|---|---|---|---|
| Polyvinylchloride resin | 100 | 100 | 100 | 100 |
| Dioctyl phthalate | 55 | 55 | 55 | 55 |
| Polyester resin plasticizer having Oxirane oxygen content (Paraplex G-62) | 5 | 5 | 5 | 5 |
| Ba-Cd phenate | 2 | 2 | 2 | 2 |
| Stearic acid | 0.5 | 0.5 | 0.5 | 0.5 |
| Triphenylphosphite | 0.5 | | | |
| Triisooctylphosphite | | 0.5 | | |
| Tri-$C_{16}$ oxo alcohol (Ex. No. 1) phosphite | | | 0.5 | |
| Tri-$C_{20}$ oxo alcohol (Ex. No. 2) phosphite | | | | 0.5 |

The compounding of the above vinyl compositions was carried out on a plastic mill at a temperature of about 320° F. and was completed in about 10 minutes. Tensile strength, 100% modulus, percent elongation and Shore A Hardness of each composition was measured and were found to be approximately equal.

Samples of each of the vinyl compositions were placed in a circulating air oven maintained at a temperature of 177° C. and inspected after certain periods of time, 1 hour, 1.5 hours, 2 hours. When freshly prepared samples of each of the compositions were water-white in color and clear. Even after one hour residence in the oven none of the samples showed discoloration. However, after about 1.5 hours residence time in the oven, the samples having the compositions A and B and containing triphenyl phosphite and tri-isooctyl phosphite, respectively, as an auxiliary stabilizing agent showed a yellow color whereas samples of compositions C and D, containing the tri-alkyl phosphites of this invention, showed only a very light yellowish tint. After 2 hours residence time in the oven the sample having the composition A was yellow-orange in color and the sample having the compositions B and C were yellow whereas the sample having the composition D exhibited only a light yellow color. In degree of heat stabilization, therefore, the $C_{20}$ oxo alcohol tri-alkyl phosphite was the best, followed closely by the $C_{16}$ oxo alcohol tri-alkyl phosphite product. The triphenyl phosphite and the tri-isooctyl phosphite exhibited definite inferiority as compared with the tri-alkyl phosphites of this invention.

Further tests of samples of the compositions set forth in Table I were carried out. More particularly, physical properties of aged samples which were maintained at 100° C. for 7 days were determined and it was observed that the tensile strength, 100% modulus, percent elongation and Shore A Hardness were satisfactory and not substantially greatly different from the values obtained from freshly prepared samples of the same composition. The 100% modulus was slightly higher for the aged samples. Retention of original physical properties after heat aging for 7 days at 100° C. is required of commercially acceptable vinyl compositions or formulations. The heat stability test or oven test carried out at 177° C. and described hereinabove is a very severe test and indicates the amount of degradation a given vinyl formulation would undergo during lengthy processing. This is a particularly significant and important test since vinyl resin processing mills work at relatively high temperatures.

Further, the tri-alkyl phosphites of this invention when incorporated in vinyl compositions impart other desirable properties thereto and possess advantages over other stabilizing agents or auxiliary stabilizing agents. Specifically, the tri-alkyl phosphites of this invention impart improved low temperature flexibility to vinyl compositions and also provide good volume resistivity. The low temperature flexibility is usually determined by the Clash-Berg test, the low temperature flexibility $T_f$ usually being reported in degrees centigrade. The value obtained gives the temperature at which a torque of 135,000 p.i. is required to rotate a test specimen one degree. Vinyl compositions incorporating the special tri-alkyl phosphites of the invention exhibit a low temperature flexibility far below 0° C.

It is mentioned that the $C_{16}$–$C_{20}$ oxo alcohol tri-alkyl phosphites are so effective as stabilizing agents as to be capable of replacing at least a portion of the primary stabilizing agent therein, e.g. as at least a portion of the barium-cadmium-containing stabilizing agent, barium-cadmium phenate. In this connection it is mentioned that the amounts of additives present or incorporated in vinyl compositions are usually expressed as phr. (parts by weight per 100 parts by weight resin). As indicated in Example 3, particularly Table I thereof, the barium-cadmium phenate stabilizing agent is incorporated in an amount of 2 phr. and the phosphites are incorporated in an amount of 0.5 phr. The subject tri-alkyl phosphites, more particularly the tri-alkyl phosphites derived from $C_{16}$-$C_{20}$ oxo alcohols, can replace at least up to one-half of the primary stabilizing additive content in the vinyl compositions, such as at least about 50% by weight of or 1 phr. of the barium-cadmium phenate stabilizing agent content of the vinyl composition, the tri-alkyl phosphite replacing the primary stabilizing agent, i.e. the tri-alkyl phosphite content being increased from 0.5 phr. to 1.5 phr.

Excellent physical properties of vinyl compositions and test results can be obtained with such replacement type vinyl resin formulations. Indeed, the tri-alkyl phosphites of this invention can be employed in higher proportions, such as 2.5 phr. or 5 phr. and higher, e.g. a minor amount as high as 5–20% by weight based on the total vinyl composition or formulation. In these higher tri-alkyl phosphite content vinyl formulations the tri-alkyl phosphites of this invention also serve to reduce the required plasticizer content, the special tri-alkyl phosphite of this invention itself serving as a combination plasticizing agent and stabilizing agent.

As will be apparent to those skilled in the art in the light of the foregoing disclosure, many modifications, alterations and substitutions are possible in the practice of this invention without departing from the spirit or scope thereof.

We claim:

A composition comprising polyvinyl chloride resin, barium-cadmium phenate and tri-alkyl phosphite wherein the alkyl groups are derived from a primary, branched chain oxo alcohol having a carbinol group near the middle of the chain and containing 20 carbon atoms per alkyl group, said barium-cadmium phenate being present in said composition in an amount in the range 1–5 parts by weight per 100 parts by weight polyvinyl chloride resin and said tri-alkyl phosphite being present in an amount in the range 0.2–5 parts by weight per 100 parts by weight polyvinyl chloride resin.

References Cited by the Examiner

UNITED STATES PATENTS

| | | | |
|---|---|---|---|
| 2,220,845 | 11/40 | Moyle | 260—461 |
| 2,678,940 | 5/54 | Boyer et al. | 260—461 |
| 2,716,092 | 8/55 | Leistner et al. | 260—45.7 |
| 2,873,263 | 2/59 | Lal | 260—45.7 |
| 2,935,491 | 5/60 | Mack | 260—45.7 |
| 2,981,716 | 4/61 | Street et al. | 260—45.7 |
| 2,985,617 | 5/61 | Salyer et al. | 260—45.7 |
| 3,000,850 | 9/61 | Ainsworth | 260—45.7 |
| 3,055,861 | 9/62 | Hersh | 260—45.7 |
| 3,061,583 | 10/62 | Huhn et al. | 260—461.315 |

LEON J. BERCOVITZ, *Primary Examiner.*

ALPHONSO D. SULLIVAN, DONALD E. CZAJA,
*Examiners.*